United States Patent [19]

Lee

[11] Patent Number: 5,992,303
[45] Date of Patent: Nov. 30, 1999

[54] COOKER WITH DEODORIZING LIQUIFICATION MEANS

[76] Inventor: Chong Wan Lee, Eunma Apt. 25-1108, Daechi-Dong, Kangnam-Ku, Seoul, Rep. of Korea

[21] Appl. No.: 08/930,244
[22] PCT Filed: Feb. 12, 1997
[86] PCT No.: PCT/KR97/00023
§ 371 Date: Sep. 30, 1997
§ 102(e) Date: Sep. 30, 1997
[87] PCT Pub. No.: WO97/28727
PCT Pub. Date: Aug. 14, 1997

[30] Foreign Application Priority Data

Feb. 12, 1996 [KR] Rep. of Korea ......................... 96-3346

[51] Int. Cl.[6] ............................. A47J 37/00; A47J 37/10
[52] U.S. Cl. .............................. 99/347; 99/403; 126/381; 126/369
[58] Field of Search ............................. 99/345–347, 403, 99/408, 339, 340; 126/381, 382, 390, 369; 220/404, 254, 502, 263, 912

[56] References Cited

U.S. PATENT DOCUMENTS

| | | | |
|---|---|---|---|
| 534,138 | 2/1895 | Cleary | 99/347 |
| 1,214,409 | 1/1917 | Barth | 99/347 |
| 1,470,281 | 10/1923 | Mohlman | 99/347 |
| 1,554,612 | 9/1925 | Wilson et al. | 99/347 |
| 1,735,589 | 11/1929 | Tollagsen | 99/347 |
| 1,968,950 | 8/1934 | Maigret | 99/347 |
| 3,085,498 | 4/1963 | Falla | 99/347 |
| 3,104,604 | 9/1963 | Schmitt | 99/312 |
| 3,232,214 | 2/1966 | Aske | 99/340 |
| 4,211,157 | 7/1980 | Sakai et al. | 99/306 |
| 4,539,899 | 9/1985 | Schmitt | 126/381 X |

Primary Examiner—Timothy Simone
Attorney, Agent, or Firm—Jones, Tullar & Cooper, P.C.

[57] ABSTRACT

A cooker including liquification structure in the form of a tub connected to the body of the cooker. The liquification structure comprises a bottom plate and a condenser forming the tub. The bottom of the tub includes a spiral groove which forms a wave.

2 Claims, 3 Drawing Sheets

COOKER WITH DEODORIZING LIQUIFICATION MEANS

TECHNICAL FIELD

The present invention relates in general to cookers such as cooking pots and, more particularly, to a structural improvement in such cookers for preventing food smell from lingering in the air while cooking, by installing liquification means to the cookers and thereby maintaining the air fresh while cooking.

BACKGROUND ART

In the integrated interior of a house where the kitchen is not partitioned from but directly communicates with the living room or bed room, food smell lingers in the indoor air while cooking thus penetrating the whole house and furthermore penetrating neighboring houses. In the case of an apartment house, the food smell spreads to the corridor air. In this regard, while cooking, the family members and neighbors become upset. To prevent this problem, a pot with a cooling tub on the top of the pot lid was invented (U.S. Pat. No. 4,539,899). But this pot has a fault in that condensing efficiency is not sufficient because vapor heats the lid directly then returns to the inside of the pot.

To increase condensing efficiency, Lid type backward flow liquification means for cooking was invented and is disclosed in U.S. Pat. No. 4,539,899 and DE. P. 3213852.0. This cooker has two hollowed tubs combined with each other vertically and between the two tubs there is a circular current tube. The two tubs are filled with coolant, so heated vapor is cooled by the coolant while passing the circular current tube. Such liquification means, however, are expensive and hard to make.

SUMMARY OF THE INVENTION

The present invention comprises a liquification means which condenses the vapor with cool water as the Lid type backward flow liquification means for cooking. According to the present invention, however, cooled and condensed vapor is discharged outside of the cooker, and a bottom plate can be cooled by air, so it can prevent an increase in the temperature of the coolant. A current tube is formed as a spiral and is projected into the cooling tub to extend the surface area which contacts the coolant, so vapor can be sufficiently cooled by water. Furthermore, this cooker collects condensed liquid outside of the cooker or returns the condensed liquid to inside of the cooker, and if needed, drinking water from sea water, and distilled liquor from the brewed liquor can be acquired.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF A PREFERRED EMBODIMENTS

Figure 1:
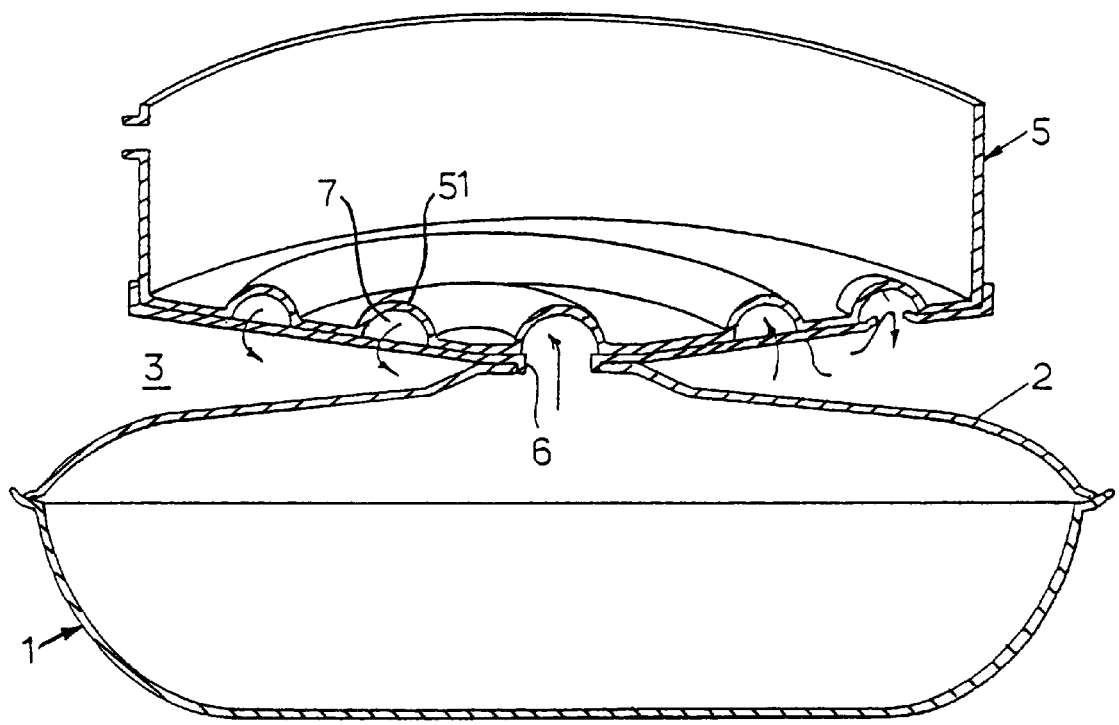
FIG. 1 is a sectional view of a cooker with the improved liquification means according to the present invention.

The pot according to the present invention comprises a body 1, a lid 2 and liquification means. The liquification means comprises a bottom plate 4 and a condenser. The bottom plate 4 and the lid 2 are separated with a space 3. The central plane of the bottom plate 4 is lower than its periphery and the condensed water flows toward the central part of the plane. A path defined by a flange 6 connects the bottom plate 4 and the lid 2. The path defined by the flange 6 may be long like a hose to separate the bottom plate 4 and the lid 2.

The condenser comprises a cooling tub 5, and the bottom of the cooling tub 5 includes a spiral groove 51. The spiral groove 51 and the upper surface of the bottom plate 4 form a spiral current tube 7. The spiral current tube 7 is opened to the outside of the condenser. The sectional shape of the spiral groove 51 (the bottom of the cooling tub 5) forms a wave.

Figure 2:
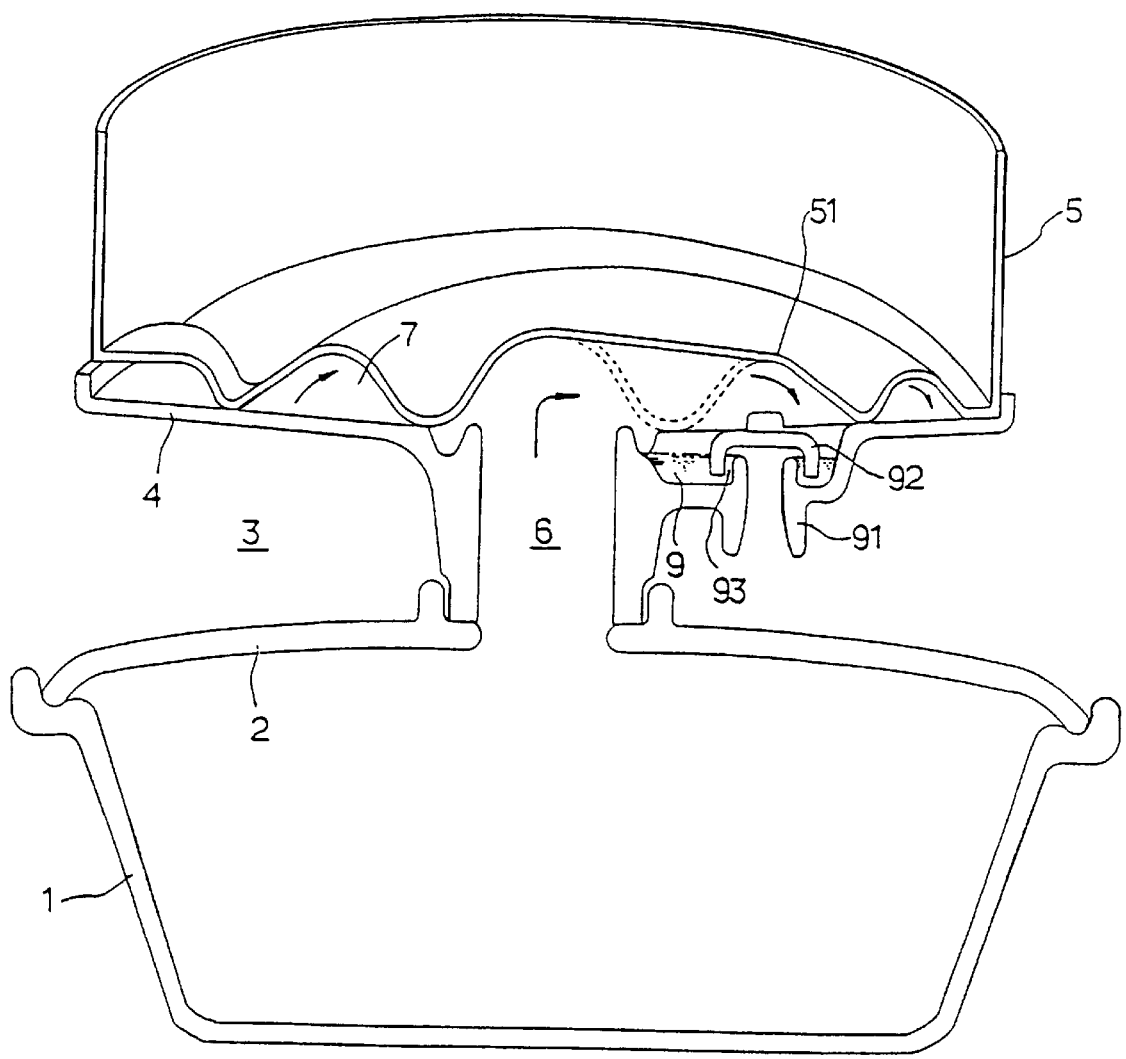
FIG. 2 is a sectional view of another embodiment of the present invention.
Figure 3:
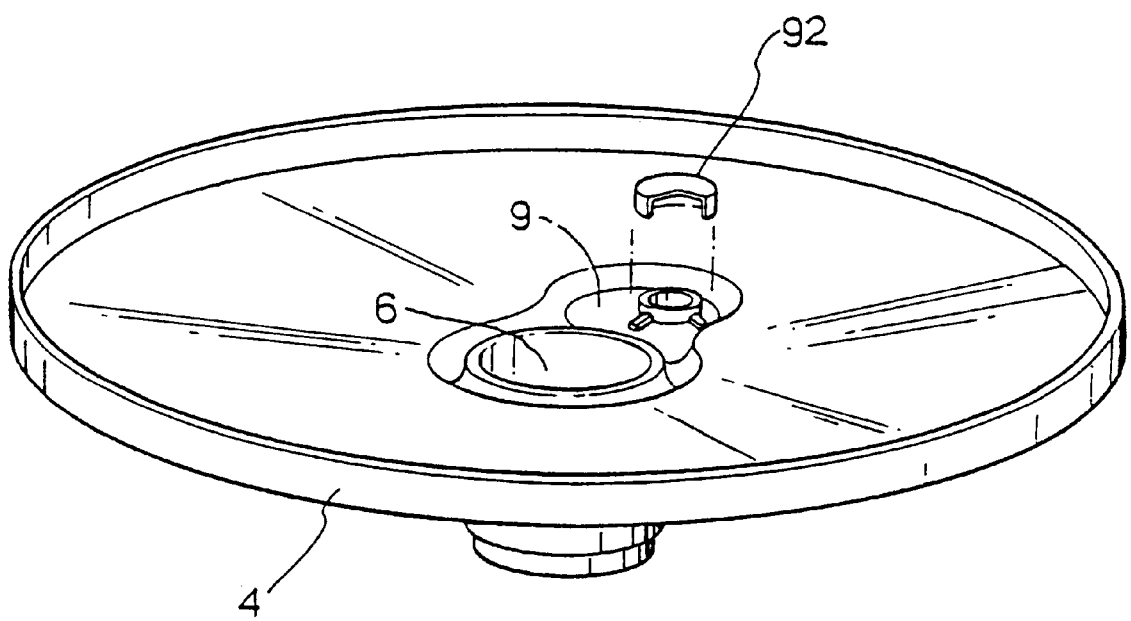
FIG. 3 is a side elevational view of a circular current tube.

FIG. 2 shows another embodiment of the present invention which comprises a chamber 9 on the bottom plate 4, a drain 91 in the chamber 9 and a cup 92 on the drain 91. The drain 91 extends upward and downward from the bottom of the chamber 9 as shown in FIG. 2.

According to the present invention, the vapor from the heated food is cooled and condensed by the cooling water of the cooling tub 5. Particularly the space 3 isolates the bottom plate 4 from the lid 2 and the air in the space 3 cools the bottom plate 4. Moreover the spiral groove 51 projects into the cooling tub 5 expanding the surface area for heat exchange. In this regard, the liquification effect is improved.

The condensed water flows into the body 1 through the path 6 as shown in FIG. 2. According to the second embodiment of the present invention, as shown in FIG. 2 the condensed water is filled in the chamber 9, and the condensed water flows through the drain 91 however the vapor cannot be drained through the drain 91 for water pressure passage 93 formed by the cup 92.

According to the present invention, the vapor from the food does not leak outside of the pot and is condensed to water. The water is returned inside of the pot, and therefore the present invention prevents the loss of aroma, tastes, and nutrients due to vaporization while cooking. Moreover, the present invention prevents diffusion of the food smell and the atmosphere of the house can be kept clean, and also the present invention prevents reduction of water from food while boiling, and provides liquification means for sea water and brew for household.

What is claimed is:

1. A cooker, comprising: a body; a lid; and liquification means, said liquification means comprising: a bottom plate; and a condenser; said bottom plate being separated from said lid such that a space is defined between them, wherein the central plane of said bottom plate is lower than the periphery of said bottom plate, said bottom plate is connected with said lid by a path, said condenser comprises a cooling tub, the bottom of which defines a spiral groove, said spiral groove and the upper surface of said bottom plate define a spiral current tube, and said spiral current tube is opened to the outside of said condenser; and wherein the sectional shape of said bottom of said cooling tub includes the spiral current tube which forms a wave.

2. A cooker as defined in claim 1, wherein the bottom plate comprises a chamber, a drain in the chamber and a cup on the drain.

* * * * *